United States Patent [19]
Yamaki

[11] Patent Number: 5,142,489
[45] Date of Patent: Aug. 25, 1992

[54] DIGITAL SIGNAL PROCESSOR WITH IMPROVED PIPELINE PROCESSING

[75] Inventor: Makio Yamaki, Tokyo, Japan
[73] Assignee: Pioneer Electronic Corporation, Tokyo, Japan
[21] Appl. No.: 636,457
[22] Filed: Dec. 31, 1990
[30] Foreign Application Priority Data
  May 11, 1990 [JP] Japan .................... 2-122252
[51] Int. Cl.⁵ .............................. G06F 7/38
[52] U.S. Cl. .................................. 364/736
[58] Field of Search ............ 364/736, 736.5, 200
[56] References Cited
U.S. PATENT DOCUMENTS
4,608,660 8/1986 Hasebe .................. 364/736.5 X
4,788,655 11/1988 Nakayama et al. ........ 364/736.5 X
4,823,258 4/1989 Yamazaki ................ 364/736 X

*Primary Examiner*—Tan V. Mai
*Attorney, Agent, or Firm*—Sughrue, Mion, Zinn, Macpeak & Seas

[57] ABSTRACT

A digital signal processor (DSP) makes a conditional judgment based on a value held in a flag register in accordance with the result of an arithmetic operation, selectively outputs data representing either a predetermined value or "0" in accordance with the result of the decision, adds the value of the output data to a value held in a coefficient memory address register, and holds the resultant value in the address register. Accordingly, in executing pipeline processing, a read address of the coefficient data memory can be directly designated without altering the flow of a program, thus shortening the processing speed and facilitating the programming.

3 Claims, 7 Drawing Sheets

Fig. 2

| ADDRESS | CONTENTS | |
|---|---|---|
| 0 | REFERENCE LEVEL DATA | |
| 1 | COEFFICIENT DATA FOR FILTER a | ⎫ |
| 2 | COEFFICIENT DATA FOR FILTER a | |
| 3 | COEFFICIENT DATA FOR FILTER a | ⎬ A |
| 4 | COEFFICIENT DATA FOR FILTER a | |
| 5 | COEFFICIENT DATA FOR FILTER a | ⎭ |
| 6 | COEFFICIENT DATA FOR FILTER b | ⎫ |
| 7 | COEFFICIENT DATA FOR FILTER b | |
| 8 | COEFFICIENT DATA FOR FILTER b | ⎬ B |
| 9 | COEFFICIENT DATA FOR FILTER b | |
| 10 | COEFFICIENT DATA FOR FILTER b | ⎭ |
| ⋮ | ⋮ | |

Fig. 3

| STEP | COMMAND |
|---|---|
| N | MOV CRAM, BUS   CMP   BUS   CPINC ; |
| N + 1 | JC   M   , S = 1 ; |
| N + 2 | JMP   N + 5 ; |
| N + 3 | NOP ; |
| N + 4 | NOP ; |
| N + 5 | (FILTER REALIZING COMMAND) |
| ⋮ | ⋮ |
| M | LOD   #6 , CP ; |
| ⋮ | ⋮ |

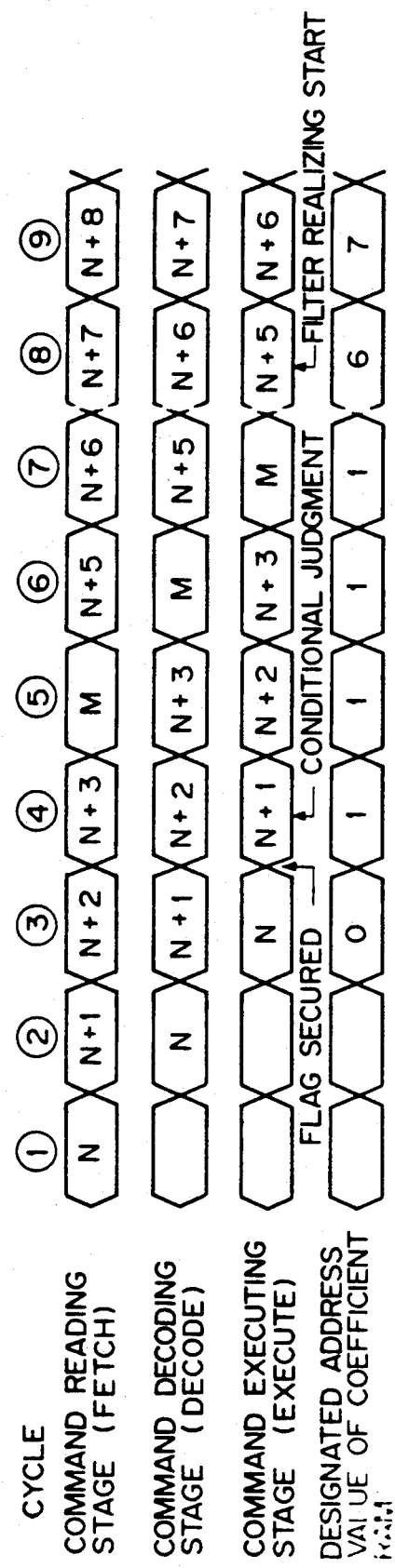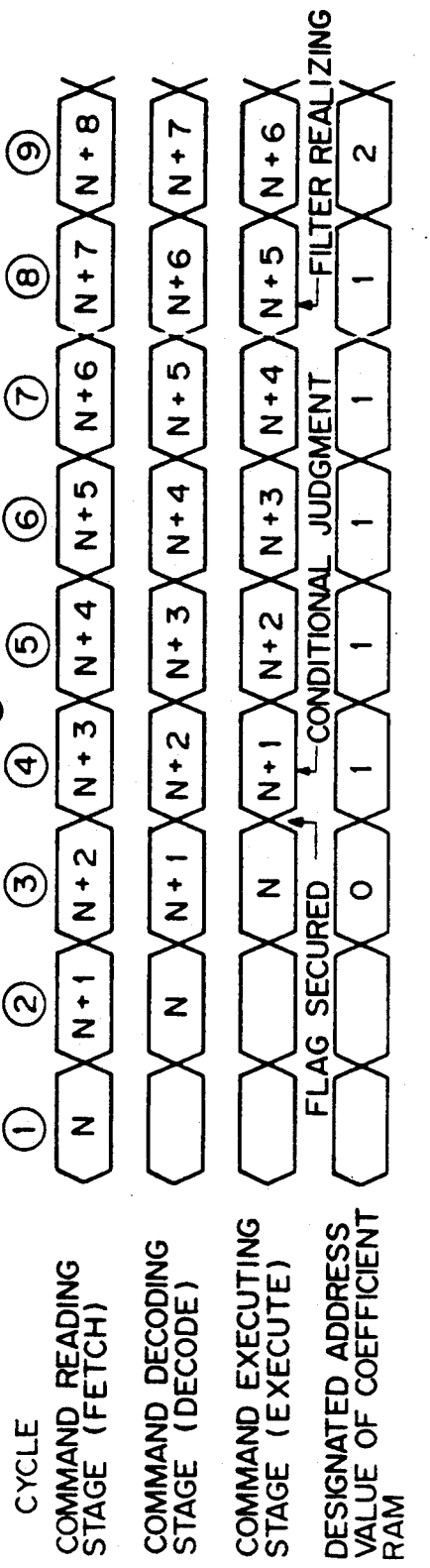

Fig. 6

| STEP | COMMAND | | |
|---|---|---|---|
| N | MOV  CRAM, BUS | CMP  BUS | CPINC; |
| N + 1 | ADCP  #5,  S = 1; | | |
| N + 2 | (FILTER REALIZING COMMAND) | | |
| ⋮ | ⋮ | ⋮ | |

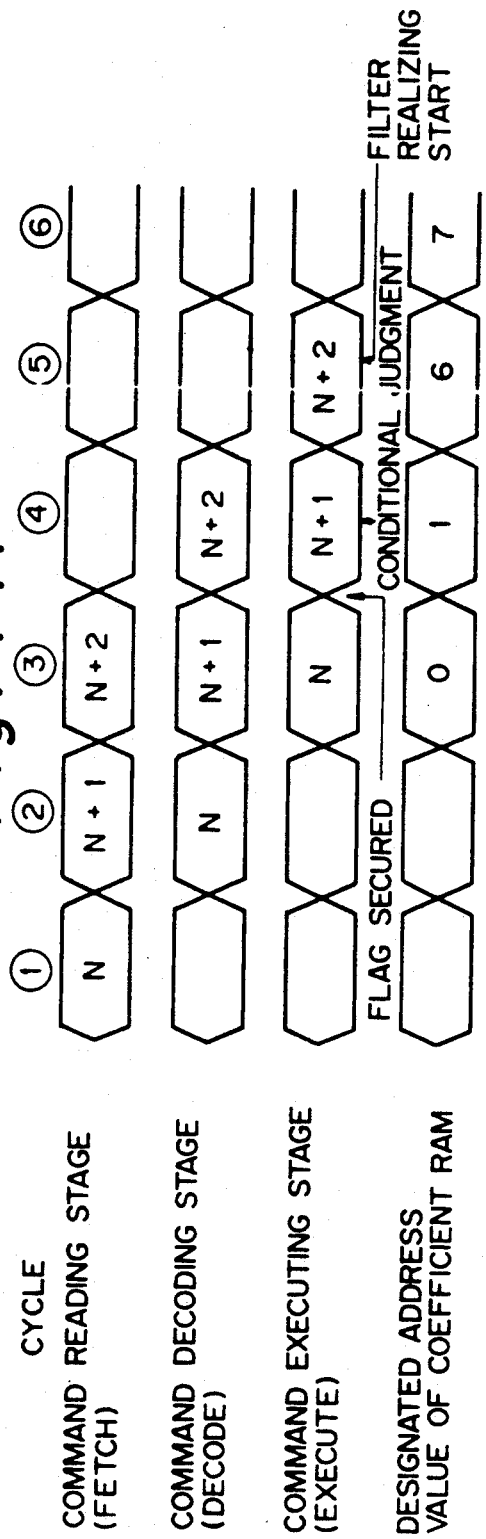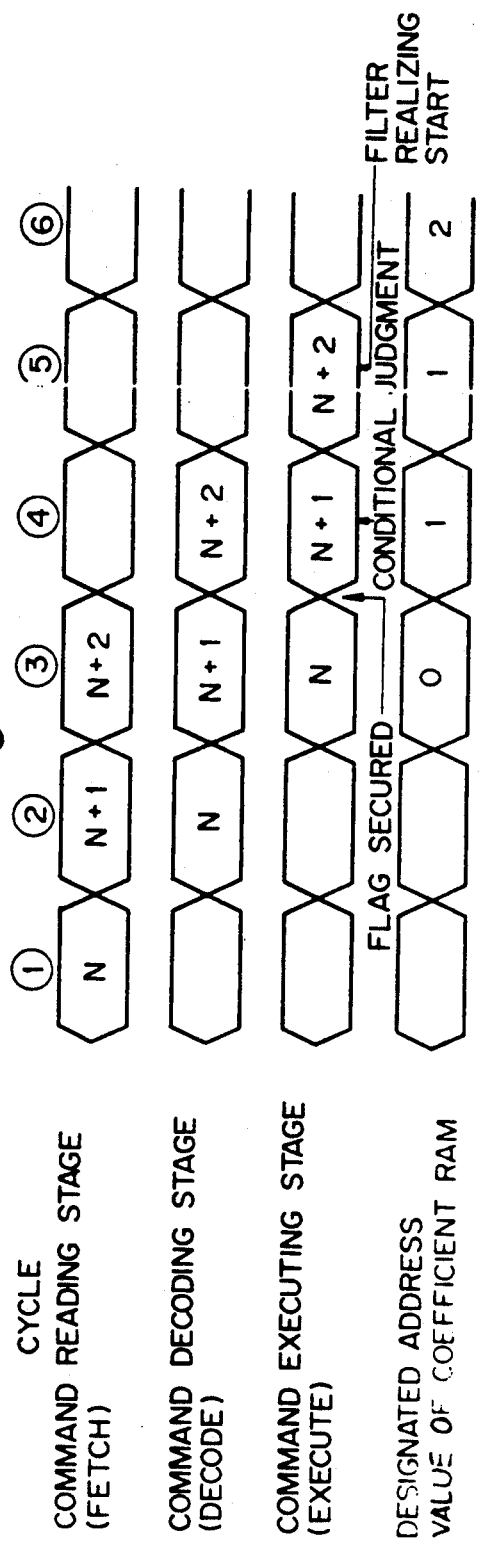

DIGITAL SIGNAL PROCESSOR WITH IMPROVED PIPELINE PROCESSING

BACKGROUND OF THE INVENTION

1. Field of the Invention

The present invention relates to a digital signal processor (hereinafter called "DSP") which receives digital signals, such as digital audio signals, and executes pipeline processing.

2. Description of the Related Art

In executing an operation according to commands in one step of a program, a DSP requires at least three stages of processing: a stage for reading out commands of the program, a stage for decoding the read-out commands, and a stage for executing the decoded commands. The "pipeline processing" is to put a plurality of commands through these three stages in order for each machine cycle, idealistically eliminating wasteful cycles.

According to the conventional DSP, however, when the pipeline processing is accompanied with a jump command which needs the result of an arithmetic operation done by an ALU, the flow of the pipeline is disturbed, requiring a wasteful cycle called "delay slot". Further, since the result of the jump command would appear two steps later, programming becomes significantly difficult.

SUMMARY OF THE INVENTION

It is therefore an object of the present invention to provide a DSP which requires no delay slot in a program that executes processing based on the result of an arithmetic operation done by an ALU in the pipeline processing and can facilitate programming.

To achieve this object, a DSP of the present invention comprises a coefficient data memory having coefficient data stored therein; command generating means for generating a command signal in accordance with a program; designating means having holding means for holding a value specified by a read address of the coefficient data memory, for altering the held value by a specific value in accordance with the command signal; arithmetic operation means for reading coefficient data from the coefficient data memory at an address specified by the held value in the holding means and performing an arithmetic operation using data including the read coefficient data in response to the command signal; and a flag register for holding one of two values in accordance with a result of the arithmetic operation done by the arithmetic operation means; the designating means including a condition judging means for discriminating the value held in the flag register, switching means for selectively outputting data representing one of a predetermined value and "0" in accordance with an output from the condition judging means and adding means for permitting the holding means to hold a value acquired by adding a value indicated by the output data of the switching means to the held value in the holding means.

According to the DSP of the present invention, data representing either a predetermined value or "0" is selectively output in accordance with the result of the decision on a condition made on the basis of the value held in the flag register, and a value acquired by adding the output data to the held value in the holding means is held in the holding means, thus ensuring direct designation of a read address of the coefficient data memory according to the condition judgment without altering the flow of the program.

BRIEF DESCRIPTION OF THE DRAWINGS

FIG. 2 is a diagram illustrating the storage contents of a coefficient data RAM;

FIG. 3 is a diagram illustrating command in each step of a program to exemplify the operation of the DSP shown in FIG. 1;

FIG. 4, FIGS. 4A-4B, is a diagram illustrating steps to be executed and designated address values of the coefficient data RAM in each stage cycle by cycle at the time of running the program shown in FIG. 3;

FIG. 6 is a diagram illustrating commands in each step of a program to explain the operation of a DSP shown in FIG. 5; and FIG. 7, FIGS. 7A-7B, is a diagram illustrating steps to be executed and designated address values of the coefficient data RAM in each stage cycle by cycle at the time of running the program shown in FIG. 6.

DETAILED DESCRIPTION OF THE PREFERRED EMBODIMENT

Figure 1:
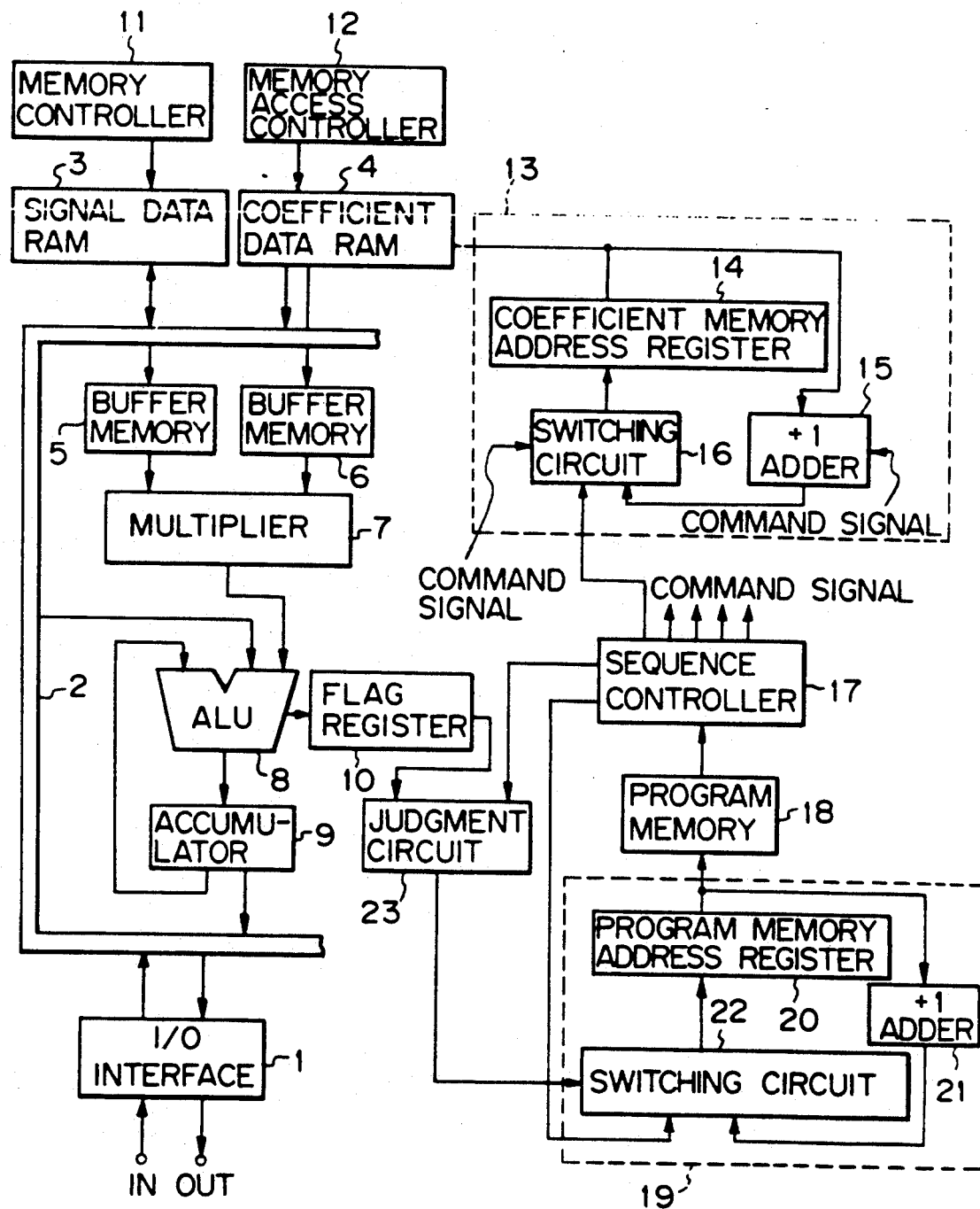
FIG. 1 is a block diagram illustrating a conventional DSP.

The structure of the conventional DSP will be first described referring to accompanying drawings. The conventional DSP has an input/output (I/O) interface 1 connected to an input terminal IN and an output terminal OUT for digital signals, as shown in FIG. 1. The I/O interface 1 is also connected to a data bus 2, to which a signal data RAM 3, a coefficient data RAM 4 and a buffer memory 5 are further connected. The signal data RAM 3 stores received digital signal data and digital signal data having undergone arithmetic operations, while the coefficient data RAM 4 stores coefficient data. The buffer memory 5 stores digital signal data to be multiplied by coefficient data by a multiplier 7. The output terminal of the coefficient data RAM 4 is connected to a buffer memory 6, which stores the coefficient data that is read from the coefficient data RAM 4 to be multiplied by signal data by the multiplier 7. The output terminal of the multiplier 7 is connected to an accumulating means including an ALU 8 and an accumulator 9. The ALU 8 performs arithmetic operations in response to a command signal from a sequence controller 17, for example, adds the multiplication result from the multiplier 7 to the value of data held in the accumulator 9. The ALU 8 also adds the value of data supplied via the data bus 2, instead of adding the output from the multiplier 7, to the value of data held in the accumulator 9. The result of the addition from the ALU 8 is held in the accumulator 9. The output of the accumulator 9 is also connected to the data bus 2. The ALU 8 is connected to a flag register 10 where the result of data comparison done by the ALU 8 is set.

A memory controller 11 controls data writing and reading of the signal data RAM 3. A memory access controller 12 controls the reading of data from the coefficient data RAM 4. A read address of the coefficient data RAM 4 is designated by a memory address controller 13. The memory address controller 13 includes a coefficient memory address register 14, a +1 adder 15, and a switching circuit 16. The address register 14 holds address data which is selectively supplied from the switching circuit 16, and sends the data to the coefficient data RAM 4. In accordance with a command signal from the sequence controller 17 which decodes a command and executes it, the +1 adder 15 adds "1" to the output address data of the address register 14, and supplies data representing the value of the added result to one input terminal of the switching circuit 16. The other input terminal of the switching circuit 16 is supplied with the coefficient address data sent from the sequence controller 17. The switching circuit 16 selectively outputs one of the two inputs in accordance with the command signal generated from the sequence controller 17.

The sequence controller 17 generates various command signals, coefficient address data, reference data for judgment, and jump address data in synchronism with a clock pulse generated from a clock generator (not shown), and in accordance with a program written in a program memory 18. The read address of command data of the program in the program memory 18 is controlled by a memory address controller 19. The memory address controller 19 comprises a program memory address register 20, a +1 adder 21, and a switching circuit 22. The address register 20 holds address data selectively sent from the switching circuit 22, and sends the data to the program memory 18. The +1 adder 21 adds "1" to the output address data of the address register 20 in synchronism with the clock pulse generated from the clock generator, and supplies the resultant data to one input terminal of the switching circuit 22. The switching circuit 22 receives the jump address data from the sequence controller 17 at the other input terminal. The switching circuit 22 selectively outputs one of the two inputs in response to a signal indicating the result of the judgment from a judgment circuit 23.

The judgment circuit 23 determines whether or not the data held in the flag register 10 coincides with the data from the sequence controller 17.

The coefficient data of the coefficient data RAM 4 and the program in the program memory 18 are written by an external microcomputer (not shown).

With such a structure, the address data generated from the address register 20 normally is incremented by "1" at each timing synchronous with the clock pulse. In other words, the address data value is added by "1" by the +1 adder 21, and the resultant data is supplied as address data via the switching circuit 22 to the address register 20, and held there; this process is repeated at every timing synchronized with the clock pulse. When a jump in the program is needed, the switching circuit 22 relays the jump address data from the sequence controller 17 to the address register 20 in accordance with the signal output from the judgment circuit 23.

Command data of the program at the address specified by the address data generated from the program memory address register 20 is read out and then sent to the sequence controller 17. The sequence controller 17 decodes the read-out command data, and outputs a command signal and data according to the command data.

There are two cases to supply and hold the address data in the coefficient memory address register 14. The first case is that the address data is sent from the sequence controller 17 via the switching circuit 16, and is held in the address register 14. The other case is that the address data held in the address register 14 is incremented by "1" by the +1 adder 15, and its resultant data is supplied as address data via the switching circuit 16 to the address register 14, and is held therein. The operations in both cases are executed in response to the command signal from the sequence controller 17.

The memory access controller 12 reads out the coefficient data specified by the address data from the coefficient memory address register 14. The read-out coefficient data is supplied directly to the buffer memory 6, or via the data bus 2 to the ALU 8.

The DSP executes three-stage pipeline processing that a fetch stage (Command reading stage), a decode stage (command decoding stage), and an execute stage (command executing stage) are overlapped.

A description will now be given regarding an example of the operation for explaining the pipeline processing in the DSP. Suppose that the accumulator 9 is holding data, and the coefficient memory address register 14 is holding address data which designates an address 0 in the coefficient data RAM 4. Also assume that the coefficient data RAM 4 has reference level data written at the address 0, coefficient data group A to realize a filter a written at the addresses 1 to 5, and coefficient data group B to realize a filter b written at the addresses 6 to 10, as shown in FIG. 2. First, the data held in the accumulator 9 is compared with the reference level data at the address 0 in the coefficient data RAM 4. If the former data has a larger value than the latter data, the address register 14 generates address data designating an address 1 to realize the filter a. If the data in the accumulator 9 has a value equal to or smaller than that of the reference level data, the address register 14 generates address data designating an address 6 to realize the filter b.

FIG. 3 shows the program in the assembler language for executing the operation of the conventional DSP shown in FIG. 1. FIGS. 4A and 4B illustrate steps to be executed and designated address values in the coefficient data RAM 4 in each stage at the time of running the program. FIG. 4A presents the case of realizing the filter b with a conditional jump made, and FIG. 4B presents the case of realizing the filter a without any conditional jump.

In step N of this program, data at the address 0 in the coefficient data RAM (CRAM) 4 is read out and sent to the data bus (BUS) 2 in response to an MOV (move) command, the data held in the accumulator 9 is compared with the data sent to the data bus 2 in response to a CMP (compare) command, and address data value of the coefficient memory address register 14 is incremented by "1" in response to a CPINC command. As shown in FIG. 4A, each command in step N is fetched in cycle 1, is decoded in cycle 2 and is executed in cycle 3. The result of the comparison done in response to the CMP command is set as a sign flag S in the flag register 10. The address data indicating a value "1" is supplied via the switching circuit 16 to the address register 14 from the +1 adder 15 in response to the CPINC command. This sets "1" for the designated address in the coefficient data RAM 4. The resultant setting and the result of the operation done in response to the CPINC command become valid from cycle 4.

Next, in step N+1, if the sign flag S is equal to "1" (if the data held in the accumulator 9 has a smaller value than the reference level data), the flow jumps to step M in response to a JC (conditional jump) command. If the sign flag S is equal to 0 (if the held data has a value equal to or greater than that of the reference level data), the flow goes to the next step. The JC command in this step N+1, like every command in step N, is processed in the pipeline sequence: the JC command is fetched in cycle 2, is decoded in cycle 3, and is executed in cycle 4. If a jump to step M is done as shown in FIG. 4A, the switching circuit 22 is set to the side of the input of the jump address data in cycle 4 in response to the signal from the judgment circuit 23 in the cycle 4. The address data (step M) is then supplied via the switching circuit 22 to the program memory address register 20 from the sequence controller 17 and is held there.

In step N+2, a jump to step N+5 is done in response to a JMP (unconditional jump) command. The JMP command causes the flow, which has branched from the main flow, to return from the branch flow of step M to the original flow. In other words, the JMP command is fetched in cycle 3, is decoded in cycle 4, and is executed in cycle 5 as shown in FIG. 4A. The jump address data (step N+5) is therefore supplied via the switching circuit 22 to the program memory address register 20 before cycle 5 is over, and the data is held in the register 20. As a result, a filter realizing command in step N+5 is fetched in cycle 6.

In step N+3, no operation is executed in response to an NOP (no operation) command. This step is provided to compensate for a delay of the command executing cycle accompanied with the JC command, or to make up for a delay slot. Accordingly, a command is fetched in cycle 4, and decoded in cycle 5, but substantially no command is executed in cycle 6.

If a jump to step M is made in response to the JC command, step M is fetched in cycle 5, is decoded in cycle 6, and is executed in cycle 7, as described above. In cycle 7, the switching circuit 16 is set to select the address data from the sequence controller 17 in response to an LOD (load) command, so that the address data indicating a value "6" is sent via the switching circuit 16 to the coefficient memory address register 14. Consequently, the designated address of the coefficient data RAM 4 becomes "6".

Since the filter realizing command is fetched in cycle 6, the operation for realizing the filter starts in cycle 8. In this filter realizing operation, the coefficient data among the coefficient data group B at the addresses 6 to 10 is read out cycle by cycle so as to realize the filter b.

When no jump is made, step N+4 is fetched in cycle 5 as shown in FIG. 4B. The step N+4, like step N+3, has an NOP command. The NOP command is provided to make the number of executing cycles unchanged irrespective of the flow of the program executed. The filter realizing command in step N+5 is fetched in cycle 6. In this filter realizing operation, the coefficient data among the coefficient data group A at the addresses 1 to 5 is read out cycle by cycle, thus realizing the filter a.

According to the conventional DSP, as described above, when the pipeline processing is accompanied with a jump command which needs the result of an arithmetic operation done by the ALU, the flow of the pipeline is disturbed, requiring a wasteful cycle called "delay slot". In addition, since the result of the jump command in step N+1 would appear two steps later, programming is significantly difficult.

One embodiment of the present invention will now be described.

Figure 5:
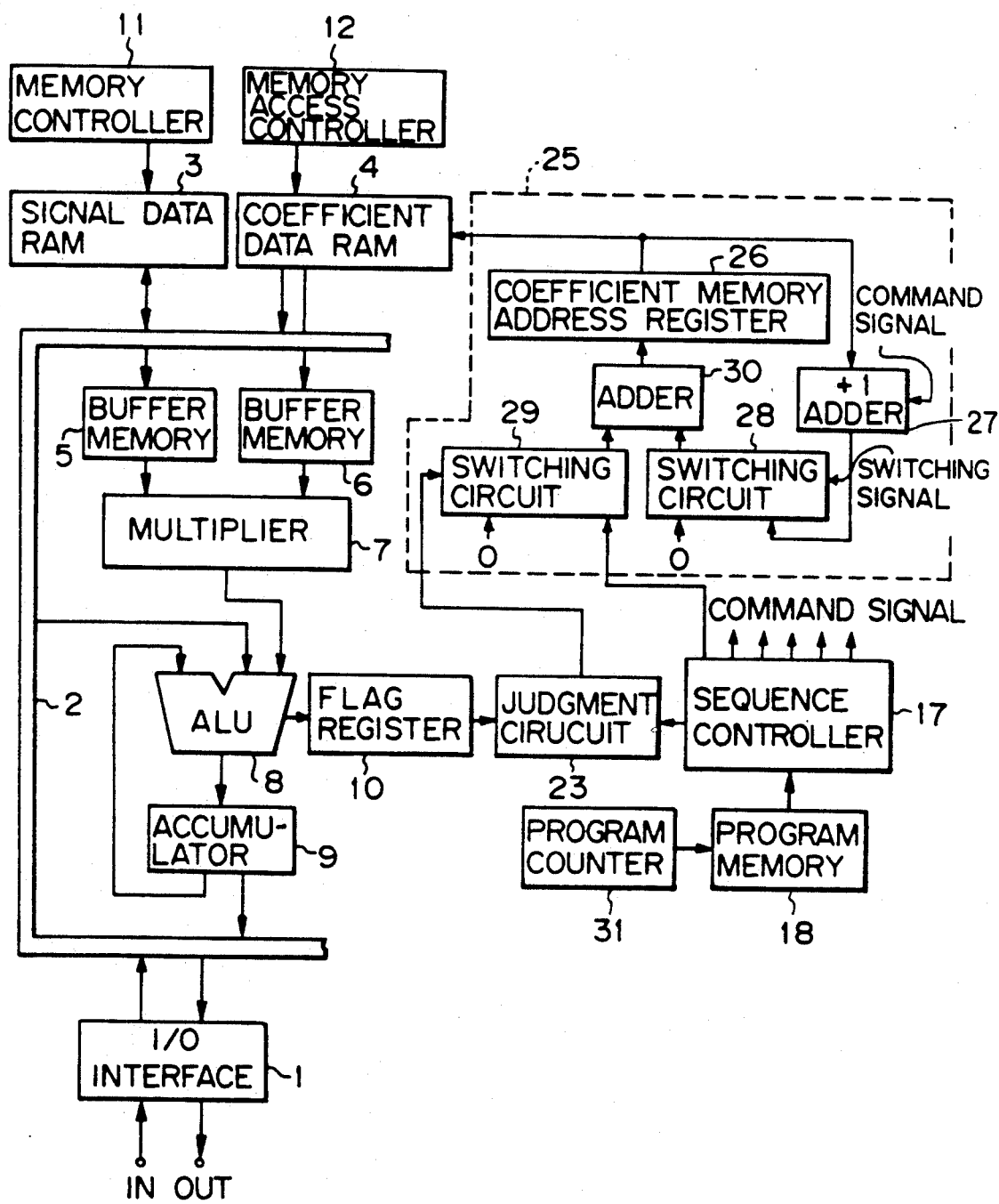
FIG. 5 is a block diagram illustrating one embodiment of the present invention.

Sections in FIG. 5 corresponding to those of the DSP shown in FIG. 1 have the same reference numbers. A read address of the coefficient data RAM 4 is designated by a memory address controller 25. The memory address controller 25 includes a coefficient memory address register 26, a +1 adder 27, switching circuits 28 and 29, and an adder 30. The address register 26 holds address data supplied from the adder 30, and sends the data to the coefficient data RAM 4. In accordance with a command signal from the sequence controller 17, the +1 adder 27 adds "1" to the output address data of the address register 26, and supplies data representing the value of the added result to one input terminal of the switching circuit 28. The other input terminal of the switching circuit 28 is supplied with data representing "0". The switching circuit 28 selectively outputs one of the two inputs in accordance with the command signal from the sequence controller 17. One input terminal of the switching circuit 29 is supplied with the address data from the sequence controller 17, and the other input terminal is supplied with data representing "0". The switching circuit 29 selectively outputs one of the two inputs in accordance with the signal indicating the result of the judgment sent from the judgment circuit 23. The adder 30 adds the values of the address data generated from the respective switching circuits 28 and 29, and sends the resultant value to the address register 26.

A program counter 31 outputs a count value as address data to the program memory 18. A command is read out from the address designated by the address data.

The other sections have the same structures as those in the DSP shown in FIG. 1.

With such a structure, when the flag register 10 holds a flag indicating the result of arithmetic operations done by the ALU 8, the sequence controller 17 supplies condition data for judgment to the judgment circuit 23. The condition data is included in a command of the program as will be described later. The judgment circuit 23 generates a switching signal when the content of the flag register 10 matches the condition data. In response to the switching signal, the switching circuit 29 relays and outputs the address data from the sequence controller 17. When the condition data and the content of the flag register 10 do not coincide with each other, the switching circuit 29 relays and outputs the address data representing an address "0".

In accordance with the command signal from the sequence controller 17, the switching circuit 28 selectively outputs either the address data from the +1 adder 27 or the address data with the address "0". The adder 30 adds the values of the address data output from the respective switching circuits 28 and 29. The coefficient memory address register 26 holds the value of the addition result as address data of the coefficient data RAM 4 for the next cycle.

A description will now be given regarding an example of the operation, which provides the same operational result as acquired by the program shown in FIG. 3, for explaining the pipeline processing in the DSP of the present invention. Suppose that the accumulator 9 is holding data, and the coefficient memory address register 26 is holding address data CP which designates an address 0 in the coefficient data RAM 4. Also assume that the coefficient data RAM 4 has data written as shown in FIG. 2. First, the data held in the accumulator 9 is compared with the reference level data at the address 0 in the coefficient data RAM 4. If the former data has a larger value equal to or larger than the latter data, the address register 26 generates address data designating an address 1 to realize the filter a. If the data in the accumulator 9 has a value smaller than that of the reference level data, the address register 26 generates address data designating an address "6" to realize the filter b.

FIG. 6 shows the program in the assembler language for executing the operation of the DSP shown in FIG. 5. FIGS. 7A and 7B illustrate steps to be executed and designated address values in the coefficient data RAM 4 in each stage at the time of running the program. FIG. 7A presents the case of realizing the filter b when a condition is satisfied, and FIG. 7B presents the case of realizing the filter a when the condition is not satisfied.

In step N of this program, data at the address 0 in the coefficient data RAM (CRAM) 4 is read out and sent to the data bus (BUS) 2 in response to an MOV (move) command, the data held in the accumulator 9 is compared with the data sent to the data bus 2 in response to a CMP command, and address data of the coefficient memory address register 26 is incremented by "1" in response to a CPINC command. As shown in FIGS. 7A and 7B, each command in step N is fetched in cycle 1, is decoded in cycle 2, and is executed in cycle 3. The result of the comparison done in response to the CMP command is set as a sign flag S in the flag register 10. The address data indicating a value "1" is supplied via the switching circuit 28 to the adder 30 from the +1 adder 27 in response to the CPINC command. As the output of the switching circuit 29 indicates "0" at this time, the output of the adder 30 becomes "1" and the address data CP held in the address register 26 indicates "1" accordingly. The result of the setting done by the CMP command and the result of the +1 addition done by the CPINC command become valid from cycle 4.

Step N+1 to be fetched in cycle 2 has an ADCP (add conditional address) command. If the sign flag S equals to "1" of the condition data, (if the data held in the accumulator 9 is smaller than the value of the reference level data), the address data CP currently held in the address register 26 is incremented by "5" in response to the ADCP command. That is, address data representing "5" is sent to the switching circuit 29 from the sequence controller 17, and it is supplied via the circuit 29 to the adder 30 in response to the switching signal from the judgment circuit 23. The +1 adder 27 outputs the presently-holding address data CP (=1) as it is, and this data is sent via the switching circuit 28 to the adder 30. As a result, the adder 30 outputs data representing "6", which is in turn held as new address data CP in the address register 26 (see FIG. 7A). If the sign flag S is equal to "0" (if the data held in the accumulator 9 is equal to or greater than the value of the reference level data), the address data CP is held unchanged (see FIG. 7B). Since this command execution is terminated during cycle 4, the address data CP becomes either "1" or "6".

As the filter realizing command is fetched in cycle 3, the filter realizing operation actually starts in cycle 5. In this operation, when the address data CP is "1", coefficient data among the coefficient data group A at addresses 1 to 5 is read out cycle by cycle to realize the filter a. When the address data CP is "6", coefficient data among the coefficient data group B at addresses 6 to 10 is read out cycle by cycle to realize the filter b.

As described above, the DSP of the present invention comprises a coefficient data memory having plural pieces coefficient data stored therein and arithmetic operation means, which reads out coefficient data from the coefficient data memory at an address specified by the held value in the holding means and performs an arithmetic operation using data including the read coefficient data. Further, a flag register is provided for holding one of two values in accordance with the result of the arithmetic operation done by the arithmetic operation means, data representing one of a predetermined value and "0" in accordance with the result of conditional judgment based on the content of the flag register is selectively outputted from switching means, and the output data of the switching means is added to the value held in the holding means and the resultant value is held again in the holding means. In executing the pipeline processing, therefore, a read address of the coefficient data memory can be directly designated without altering the flow of the program (such as jumping). This arrangement can eliminate the need for a delay slot in a program requiring the result of an arithmetic operation at the time of executing the pipeline processing, thus shortening the processing speed and facilitating the programming.

What is claimed is:

1. A digital signal processor comprising:
   a coefficient data memory having coefficient data stored therein;
   command generating means for generating a command signal in accordance with a program;
   designating means having holding means for holding a value specified by a read address of said coefficient data memory, for altering the head value by a specific value in accordance with said command signal;
   arithmetic operation means for reading coefficient data from said coefficient data memory at an address specified by the held value in said holding means and performing an arithmetic operation using data including the read coefficient data in response to said command signal; and
   a flag register for holding one of two values in accordance with a result of the arithmetic operation done by said arithmetic operation means;
   wherein said designating means includes condition judging means for discriminating the value held in said flag register, switching means for selectively outputting data representing one of a predetermined value and "0" in accordance with an output from said condition judging means and adding means for permitting said holding means to hold a value acquired by adding a value indicated by the output data of said switching means to the held value in said holding means.

2. The digital signal processor according to claim 1, wherein said predetermined value is included as data in said program.

3. The digital signal processor according to claim 1, wherein said flag register holds a value representing a result of a comparison executed by said arithmetic operation means.

* * * * *